455-606 AU 233 EX

FIP8106 OR 3,571,549

United St...es

[11] 3,571,549

[72] Inventors Walter M.
Laguna Beach;
Matthew B White, Newport Beach; Elias Reisman, Orange; George Joseph Galassi; Wesley Duane Gerber, Santa Ana, Calif.

[21] Appl. No. 726,315
[22] Filed May 3, 1968
[45] Patented Mar. 23, 1971
[73] Assignee Philco-Ford Corporation Philadelphia, Pa.

[54] AUTOCOLLIMATING OPTICAL HETERODYNE TRANSCEIVER
11 Claims, 4 Drawing Figs.

[52] U.S. Cl. 200/199
[51] Int. Cl. H04b 9/00
[50] Field of Search 250/199

SD
Cited
UNITED STATES PATENTS

| | | | |
|---|---|---|---|
| 3,353,896 | 11/1967 | Blattner | 218/199 |
| 3,409,369 | 11/1968 | Bickel | 250/199 |

*Primary Examiner*—Robert L. Griffin
*Assistant Examiner*—Anthony H. Handal
*Attorney*—Robert D. Sanborn

ABSTRACT: A laser system that utilizes a single laser as a transmitter, a local oscillator and a preamplifier. This system also provides automatic collimating of the transmitter and local oscillator light beams. The frequency of the local oscillator beam and the frequency of the transmitted beam are made different so that a difference frequency beat note can be obtained. This beat note is indicative of the information gathered by the system.

PATENTED MAR 23 1971 3,571,549

INVENTORS
WALTER M. DOYLE
MATTHEW B. WHITE
GEORGE JOSEPH GALASSI
ELIAS REISMAN
WESLEY DUANE GERBER
BY Leonard Zalman
ATTORNEY

AUTOCOLLIMATING OPTICAL HETERODYNE TRANSCEIVER

Laser devices typically produce coherent monochromatic light of high intensity and narrow beam spread. Many systems have been proposed for utilizing generated light beams. By way of example, laser communication systems have been proposed wherein a laser generated light beam is modulated to serve as the carrier signal of modulation intelligence and radar systems have been proposed wherein a laser generated light beam, by being bounced off a distant object, is used to determine the distance and speed of the object.

Frequently, an optical form of electromagnetic heterodyne system is used to detect the narrow band light beam in the above-mentioned systems. Incoming laser originated light energy to be detected is supplied to a photomixer tube together with light energy from a second laser light source which serves as a local oscillator for the system and which has a frequency different from that of the light energy supplied by the first laser. The electrical energy output of the photomixer contains a frequency component corresponding to the difference of the frequencies of the two input light energies. By employing as a local oscillator a laser having an output frequency which differs from the frequency of the incoming light energy by a sufficiently small amount, the difference frequency can be brought within the ratio of microwave frequency range and can thus be demodulated, amplified, and detected by conventional radio or microwave frequency devices.

A substantial difficulty in providing a practical embodiment in such a heterodyne system is the requirement that to obtain a difference frequency output signal, the incoming light and that from the local oscillator must be so oriented that the plane wavefronts of the two light energies as they impinge on the photomixer tube, are very nearly parallel to each other. Even a small deviation from parallelism between wavefronts creates undesirable interference in the photomixer tube.

It is an object of the present invention to provide a new and improved light detecting system which ensures the automatic collimating of two or more laser light beams.

It is a further object of the present invention to provide an optical light detecting system which does not require a separate local oscillator laser light source.

A third object of the present invention is to provide effective optical preamplification of an incoming optical signal prior to heterodyne detection.

In accordance with the present invention, a laser is provided which emits radiant energy through both resonator mirrors. Radiant energy from one mirror is applied to a photodetector of a laser receiver system such as a local oscillation, while energy from the other mirror is directed toward a remote region, through the usual output optics. Energy returning from the remote region, either by way of reflection from a target as in a radar system or by way of a retrodirective device as in a communicator, passes through the output optics back into the laser. If the frequency of the returning energy is different from the frequency of the oscillation modes of the laser by only a small amount, the returning energy passes through the laser. If the gain of the active laser mechanism equals or exceeds the losses of the laser cavity including the transit losses through the two reflectors, the passed beam is either unattenuated or is amplified. Since the local oscillation energy and the amplification of the returning energy are produced by the same laser, automatic collimation between the local oscillation energy and the amplified returning energy is achieved.

For a better understanding of the present invention together with other and further objects thereof reference should now be had to the following detailed description which is to be read in conjunction with the accompanying drawings in which:

FIG. 3A and 3B are graphs showing the oscillation modes of the laser cavity of the system of FIG. 1.

While the present invention is of general application with respect to optical heterodyne transceivers, it has particular utility in laser radar systems. Accordingly, the invention will be described in this environment.

Figure 1:
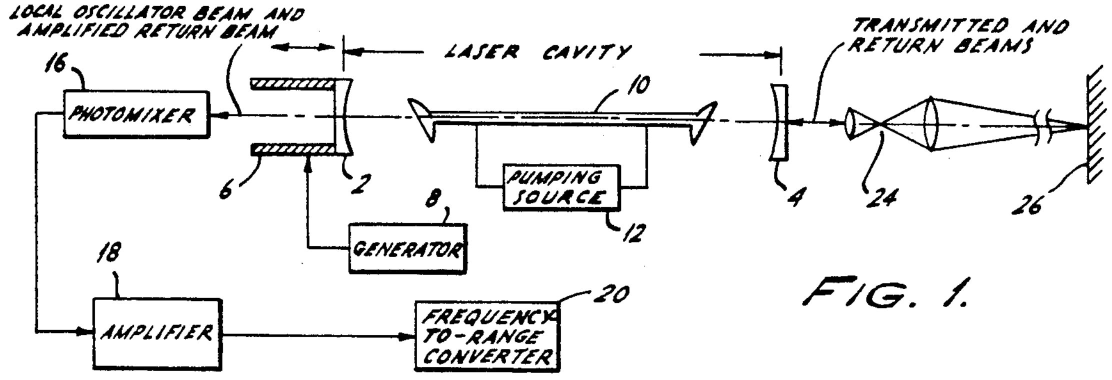
FIG. 1 is a block diagram of a system embodying the invention in a particular form.

Referring now to FIG. 1 of the drawings, which shows a laser radar ranging system in accordance with the present invention, two confocal spherical reflectors 2 and 4 define the ends of a laser cavity extending therebetween. Reflector 2 is mounted on or is formed in the end of an electromechanical transducer 6, such as, for example, a piezoelectric transducer. A variable amplitude voltage, such as a sawtooth waveform, is supplied to transducer 6 by a generator 8. The length of transducer 6, and hence the length of the laser cavity, is a function of the amplitude of the voltage supplied by generator 8.

A conventional laser tube 10 is disposed between reflectors 2 and 4. By way of example, laser tube 10 may be a helium-neon laser adapted to emit a continuous output beam of coherent monochromatic light. A conventional pumping source 12 is coupled to plasma tube 10 in a conventional manner. The structure and operation of the above-mentioned laser is well known to those skilled in the art and accordingly is not described in detail herein.

Reflectors 2 and 4 are both partially transmissive so that some of the optical energy present in the laser cavity exists the laser cavity through these reflectors. The energy that exist through reflector 2 is intercepted by a photomixer 16 which may be a conventional photodiode such as a lead sulfide or an indium arsenide photodetector. The output signal of photomixer 16 is supplied to an amplifier 18, the output of which is supplied to a frequency-to-range converter network 20.

The energy that exists the laser cavity through reflector 4 is focused by an optical system 24 onto a target 26, the range of which is to be ascertained. For simplicity it will be assumed that target 26 is stationery. Target 26 reflects some of the light incident thereon and optical system 24 directs some of the reflected light through the laser cavity and onto photomixer 16.

Figures 2, 3:
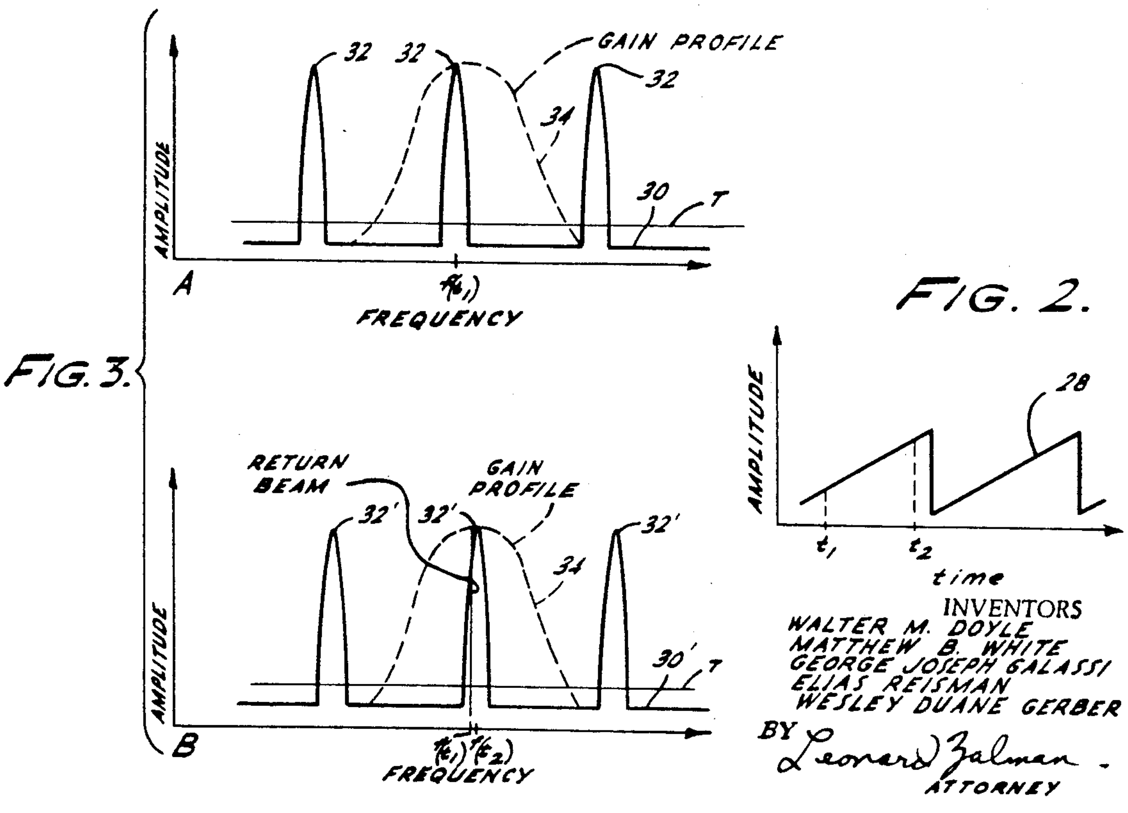
FIG. 2 is an illustrative signal supplied to a component of the system of FIG. 1.

The operation of the system of FIG. 1 will now be explained in conjunction with FIGS. 2 and 3. FIG. 2 shows the amplitude versus time waveform 28 of the signal supplied by generator 8 to transducer 6 of FIG. 1. Waveform 28 is merely illustrative of the waveform that can be supplied to transducer 6 and its use in this explanation is not meant to limit the invention in any way. Any waveform which changes amplitude in a predetermined manner such as a waveform the amplitude of which varies exponentially or sinusoidally, can be supplied to transducer 6.

Curve 30 of FIG. 3A represents the amplitude response with respect to frequency of the laser cavity at time $t_1$ on the waveform of FIG. 2. Curve 30 in FIG. 3A has several peaks 32 spaced therealong which represent the oscillation modes, that is, the reinforced modes, of the laser cavity. The frequencies of these peaks 32 are a function of the length of the laser cavity, that is, the difference between reflectors 2 and 4. Curve 30′ and peaks 32′ of FIG. 3B represent the amplitude response and the oscillation modes, respectively, of the laser cavity at time $t_2$ of FIG. 2. Since the distance between reflectors 2 and 4 varies in accordance with the amplitude of the signal supplied to transducer 6 is different at times $t_1$ and $t_2$, the frequencies of the peaks of 32′ of FIG. 3B are displaced relative to the corresponding peaks 32 of FIG. 3A.

Curve 34 of FIGS. 3A and 3B represents the gain profile of a typical gas that can be used in the laser tube 10 of FIG. 1. The gain profile of a gas indicates the frequencies at which the gas will amplify light energy and the relative gain of the light amplified at each frequency. It will be seen that the gain profile 34 overlies only one of the peaks 32 of curve 30. This condition is desirable since it will limit the output of the laser cavity to a single resonant mode (the mode overlaid by curve 34) and thereby prevent undesirable beat notes from appearing at the output of photomixer 16. Line T of FIGS. 3A and 3B indicates the gain below which a particular laser mode will cease oscillation. This threshold gain is a function of the transmissivity of the reflectors 2 and 4 of the laser cavity and of other intracavity losses.

At time $t_1$, the light energy passes through the reflector 4 has a frequency $f(t_1)$ (FIG. 3A). This light energy is focused upon the target 26 (FIG. 1) and the light energy reflected from target 26, which still has a frequency $f(t_1)$ due to the target 26 being stationary, arrives at reflector 4 at, for example, time $t_2$. Due to the movement of transducer 6 and hence reflector 2 during the transit time of the reflected energy, the oscillation frequency of the laser cavity when the reflected energy arrives at reflector 4 is $f(t_2)$ (FIG. 3B). Since the frequency of the reflected energy is near the present oscillation frequency of the laser cavity, a portion of it passes back into the laser cavity and increases the intracavity energy density. In this way reflector 4 and target 26 together form a compound reflector whose reflectivity varies at frequency $f(t_2)$-—$f(t_1)$. The time varying laser cavity reflector, thus produced, gives rise to an amplitude modulation of the radiant energy that passes out through reflector 2 and strikes the photomixer 16. Hence, an electrical signal is produced at the output of photomixer 16 which has a frequency $f(t_2)—f(t_1)$. Under favorable conditions this electrical signal is greater than the signal that would be produced if the energy reflected from the target were coherently detected by directly photomixing it with the instantaneous output of the laser at time $t_2$ (that is with the local oscillator). Therefore, under these favorable conditions an effective optical amplification of the reflected signal is achieved. After electrical amplification, the frequency difference signal is applied to a frequency range converter. Since the oscillation mode frequency is varying at a known rate determined by the waveform of FIG. 2, converter 20 can take the form of a frequency meter which is calibrated in terms of the range of target 26 and which can include a range indicating device.

By using a single laser simultaneously as a transmitter, receiver local oscillator, and receiver preamplifier, the transmitter and receiver optics of the system of FIG. 1 are one and the same. This assures automatic alignment of the local oscillation beam (the oscillation energy) and the reflected beam (the reflected energy). In addition, the use of the oscillating laser as a preamplifier leads to improved performance since an optical amplifier overcomes all types of electronic receiver noise, including shot noise, due to local oscillations.

Figure 4:
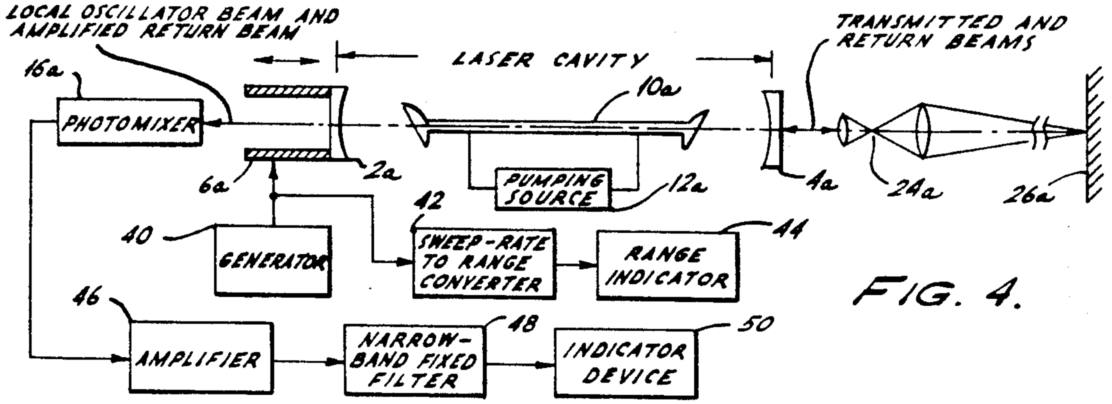
FIG. 4 is a block diagram of another system embodying the present invention.

FIG. 4 is a block diagram of a second embodiment of a ranging system in accordance with the present invention. In FIG. 4 components corresponding to like components of FIG. 1 have been indicated by the same reference numerals with the suffix *a*. Generator 40 is similar to generator 8 of FIG. 1 but includes, in addition thereto, circuitry for varying the sweep rate of the generator. This additional circuitry may comprise a variable gain amplifier (not shown). In addition to being supplied to transducer 6*a*, the output signal of generator 40 is also supplied to a sweep rate-to-range converter 42, the output terminal of which is coupled to a range indicator 44. Converter 42 can be a differentiator circuit which produces an output voltage proportional to the rate of change of the input signal thereto. Detector 16*a* is coupled to a cascade connected circuit comprising, in the order mentioned, an amplifier 46, a narrow band fixed filter 48, and an indicator device 50.

To determine the range of target 26*a*, the sweep rate of the generator 40 is varied until device 50 indicates that filter 48 is passing the difference frequency beat note signal produced by photomixer 16*a*. As the range of target 26*a* increases, a slower sweep rate is required to produce a beat note that can be passed by filter 48. Converter 42 is calibrated to convert the sweep rate of generator 40 to a range indication which is physically displayed by indicator 44.

Although the invention has been described with particular reference to ranging systems, the autocollimating optical heterodyne transceiver of the present invention can also be used in many other systems. For example, the invention can be used in Doppler shift measurement, interferometry or subcarrier phase-shift ranging.

While the invention has been described with reference to certain preferred embodiments thereof, it will be apparent that various modifications and other embodiments thereof will occur to those skilled in the art within the scope of the invention. Accordingly, we desire the scope of our invention to be limited only by the appended claims.

We claim:

1. An autocollimating optical heterodyne transceiver system comprising first and second spaced reflectors positioned to form a closed optical cavity therebetween a laser tube disposed in said cavity, first means for pumping said tube, said tube having oscillation modes each of said first and second reflectors being partially transmissive whereby light exits said cavity through both reflectors, means for directing said light existing from said first reflector onto a light-reflecting target and for directing some of said directed light reflected by said target back into said first reflector, said laser tube, and said second reflector, second means for continuously varying the frequency of one of said oscillation modes to produce a difference between the frequency of said reflected light passing through said laser tube and the contemporaneous frequency of said one oscillation mode, and third means for detecting the light beam exiting said second reflector to determine said frequency difference.

2. The system of claim 1 wherein said second means changes the frequencies of said oscillation modes of said laser cavity at a predetermined rate.

3. An autocollimating optical heterodyne transceiver system comprising first and second spaced reflectors positioned to form a closed optical cavity therebetween, a laser tube disposed in said path, first means for pumping said tube, said tube having oscillation modes the frequencies of which are determined by the distances between said first and second reflectors, each of said first and second reflectors being partially transmissive whereby light exits said optical cavity through both reflectors, second means for directing some of the light existing from said first reflector onto a light-reflecting target and for directing some of said directed light reflected by said target back into said laser tube so that said returned light exits the optical cavity through said second reflector collimated with said light issuing directly from said laser tube through said second reflector, third means for continuously varying the spacing between said first and second reflectors thereby to vary continuously the frequency of one of said oscillation modes to produce a difference between the frequency of said returned light passing through said laser tube and the contemporaneous frequency of said one of said oscillation modes, and fourth means for detecting the light beam exiting said second reflector to determined said frequency difference.

4. The system of claim 3 is which said third means comprises a transducer coupled to said second reflector and generator means coupled to said transducer for supplying to said transducer a voltage having a predetermined amplitude sweep rate, whereby said second reflector moves along the optical axis of said cavity at a predetermined rate thereby changing the frequencies of said oscillation modes of said laser cavity at a predetermined rate.

5. The system of claim 4 in which said second means includes target means information about which is to be ascertained.

6. The system of claim 5 in which fifth means are coupled to said fourth means for producing an output indicative of the range of said target from said cavity.

7. The system of claim 6 in which said fifth means includes a frequency-to-range converter, said frequency-to-range converter being calibrated so that the output thereof is indicative of the range of said target.

8. The system of claim 7 in which said second means further includes an optical focusing system.

9. The system of claim 6 in which said generator means including means for changing the sweep rate of said signal supplied by said generator means to said transducer, and in which said fifth means are coupled to said generator means.

10. The system of claim 9 in which said fifth means includes a narrow-band frequency filter coupled to the output of said fourth means and an indicator device coupled to the output of said filter, said indicator device indicating what sweep rate of said generator means produces a signal at the output of the fourth means that will be passed by said filter, and in which said fifth means further includes a calibrated sweep rate-to-frequency converter coupled to said generator means.

11. The system of claim 10 in which said second means further includes an optical focusing system.